United States Patent
Xu et al.

(10) Patent No.: US 6,641,932 B1
(45) Date of Patent: *Nov. 4, 2003

(54) MAGNETIC THIN FILM MEDIA WITH CHROMIUM CAPPING LAYER

(75) Inventors: Weilu Xu, San Jose, CA (US); Yuanda R. Cheng, Singapore (SG); Taesun Ernest Kim, San Jose, CA (US); Chung Shih, Cupertino, CA (US); Liji Huang, San Jose, CA (US); Kueir Weii Chour, San Jose, CA (US); Steve Hwang, San Jose, CA (US); Roger Shih, Cupertino, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 09/892,626

(22) Filed: Jun. 28, 2001

Related U.S. Application Data (60) Provisional application No. 60/230,000, filed on Sep. 5, 2000.

(51) Int. Cl.[7] ................................................. G11B 5/66
(52) U.S. Cl. ....................... 428/666; 428/457; 428/336; 428/667; 428/694 TP
(58) Field of Search ................................... 428/336, 457, 428/666, 667, 694 TP (56) References Cited

U.S. PATENT DOCUMENTS

| | | | | |
|---|---|---|---|---|
| 4,789,598 A | * | 12/1988 | Howard et al. | 428/408 |
| 5,672,425 A | * | 9/1997 | Sato et al. | 428/332 |
| 6,146,737 A | * | 11/2000 | Malhotra et al. | 428/65.3 |
| 6,340,521 B1 | * | 1/2002 | Nguyen et al. | 428/336 |

* cited by examiner

Primary Examiner—Stevan A. Resan
(74) Attorney, Agent, or Firm—McDermott, Will & Emery (57) ABSTRACT

A flash chromium capping layer is deposited on a magnetic layer for improved corrosion resistance, reduced poisoning due to the absence of a protective overcoat or presence of discontinuities in a protective overcoat, and for reduced media noise do to inter-granular exchange coupling. Embodiments include depositing a flash chromium layer having a thickness up to about 10 Å on an upper magnetic layer and depositing an overlying lubricant topcoat. An optional protective overcoat, such as a carbon-containing protective overcoat, can also be deposited on the chromium capping layer. The chromium capping layer forms a protective oxide coating where exposed, as due to the absence of or at discontinuities in the protective overcoat.

15 Claims, 5 Drawing Sheets

MAGNETIC THIN FILM MEDIA WITH CHROMIUM CAPPING LAYER

RELATED APPLICATION

This application claims priority from Provisional Patent Application Ser. No. 60/230,000 filed Sep. 5, 2000 entitled "MULTILAYER MAGNETIC MEDIA WITH CHROME CAPPED LAYER", the entire disclosure of which is hereby incorporated by reference herein.

TECHNICAL FIELD

The present invention relates to magnetic recording media, particularly rotatable recording media, such as thin film magnetic disks cooperating with a magnetic transducer head, particularly a magnetoresistive (MR) or a giant magnetoresistive (GMR) head. The present invention has particular applicability to high areal density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data-transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg) alloy, plated with a layer of amorphous nickel-phosphorus (NiP). Alternative substrates include glass, ceramic, glass-ceramic, and polymeric materials and graphite. The substrate typically contains sequentially deposited on each side thereof at least one seedlayer and/or at least one underlayer, such as chromium (Cr) or a Cr-alloy, e.g., chromium vanadium (CrV), a cobalt (Co)-based alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface. Conventional practices further include forming a servo pattern on the magnetic layer thereby producing topographical nonuniformities. Such servo patterns can be formed by photolithographic or laser techniques.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms the lubricant is typically dissolved in an organic solvent, applied and bonded to the carbon overcoat of the magnetic recording medium by techniques such as dipping, buffing, thermal treatment, ultraviovlet (UV) irradiation and soaking.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require recording heads with narrower track width and reduced gap, reduced media noise and/or smaller flying heights, i.e., the distance by which the head floats above the surface of the disk in the disk drive (head-disk interface). For conventional media design, a decrease in the head to media spacing increases stiction and drive crash.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

The drive for high area recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions, such as cobalt (Co) and nickel (Ni), from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

The continuing drive for increased recording areal density in the magnetic recording media industry mandates reduction of the thickness of the protective overcoats, e.g., the carbon protective overcoat and lubricant film, since such layers constitute part of the head-medium separation. In order to satisfy the continuing drive for higher recording areal densities, the head-medium separation requirement at, for example, 100 Gb/in$^2$ recording areal density, the protective overcoat thickness and the lubricant film thickness must be significantly reduced. However, as the thickness of such layers are reduced, significant issues arise in that the continuity and integrity of the protective and lubricant films are difficult to maintain. Consequently, imperfections, e.g., discontinuities or openings, in the protective overcoats increase leading to degradation of recording performance due to environmental attacks, such as corrosion. Thus, the corrosion problem prevents reduction of protective overcoats to a thickness less than the physical limit below which the films are no longer continuous, thereby significantly limiting reduction of the head-medium separation required to increase areal recording density.

Another problem confronting the drive for increased areal recording density leading to corrosion problems stems from the formation of topographical patterns on the substrate and/or magnetic layer which are substantially reproduced in overlying layers. In order to increase areal recording density, both bit density and track density must be increased. However, when increasing track density to a high level, e.g., greater than 100,000 tracks per inch, the track becomes too narrow to be formed by conventional servo track writing techniques. Lithographic patterning techniques have been employed to create fine topographical patterns on a disk for servo purposes, wherein the track density can be increased significantly beyond 100,000 tracks per inch. However, the formation of such topographical patterns renders the medium more susceptible to environmental attacks, because it is extremely difficult to cover the surface of the magnetic layer containing such lithographic features with a thin layer of a protective overcoat, such as carbon, in addition to a thin lubricant layer.

There are additional problems attendant upon increasing areal recording density for thin film media. Such additional problems include increased intrinsic media noise stemming from inter-grain exchange coupling as the grain size is reduced, and increased vulnerability of a magnetic surface to poisoning from residual gases in a vacuum system and process gases in forming a protective overcoat, due to the high temperature required to achieve high coercivity media.

Accordingly, there exists a need for high areal density magnetic recording media having reduced inter-granular exchange coupling and a significantly reduced head-medium separation, while simultaneously exhibiting adequate resistance to environmental attacks, such as corrosion, and reduced vulnerability to poisoning from residual and process gases, and a need for enabling methodology.

DISCLOSURE OF THE INVENTION

An advantage of the present invention is a high areal recording density magnetic recording medium exhibiting reduced inter-granular exchange coupling, reduced vulnerability to residual and process gases and improved corrosion resistance.

Another advantage of the present invention is a method of manufacturing a high areal density magnetic recording medium exhibiting reduced inter-granular exchange coupling, reduced vulnerability to residual and process gases and improved corrosion resistance.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium comprising: a non-magnetic substrate; an underlayer over the substrate; a first magnetic layer over the underlayer; and a capping layer, consisting essentially of chromium and/or chromium oxide and having a thickness up to about 10 Å, on the first magnetic layer.

Embodiments of the present invention include forming multi-underlayers and multi-magnetic layers, such as first and second magnetic layers, each containing Co and Cr, the second magnetic layer being formed between the uppermost underlayer and first magnetic layer. Embodiments of the present invention include depositing a thin capping layer of chromium directly on the first magnetic layer, as at a thickness of about 3 Å to about 10 Å, such as about 3 Å to about 8 Å, e.g., about 5 Å to about 8 Å. A lubricant topcoat, as at a thickness of about 10 Å, is deposited over the chromium capping layer. Embodiments of the present invention further include depositing a protective overcoat, such as at a carbon-containing protective overcoat, directly on the chromium capping layer, as at a thickness up to about 50 Å, e.g., about 3 Å to about 45 Å. Upon exposure of the chromium capping layer, as in embodiments where a protective overcoat is not employed or in embodiments comprising a protective overcoat having discontinuities, chromium is oxidized to form a chromium oxide, e.g., chromic oxide ($Cr_2O_3$), thereby ensuring protection of the underlying first magnetic layer.

Another aspect of the present invention is a method of manufacturing a magnetic recording medium, the method comprising: forming an underlayer over a non-magnetic substrate; forming a first magnetic layer over the underlayer; and depositing a chromium capping layer on the first magnetic layer.

Embodiments of the present invention further include forming a second magnetic layer containing Co and Cr between the underlayer and the first magnetic layer, and depositing a lubricant topcoat over the chromium capping layer with an optional protective overcoat therebetween.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention addresses and solves problems generated when attempting to manufacture high areal density magnetic recording media having a sufficiently reduced head-medium separation. Such problems include the increased intrinsic media noise due to inter-granular exchange coupling attendant upon a reduction in grain size, increased vulnerability of the surface of the magnetic layer to poisoning from residual and/or process gases due, in part, to the high temperature needed to achieve high coercivity, and increased corrosion attendant upon reducing the thickness of protective overcoats, e.g., due to imperfections in the protective overcoat system. The present invention addresses and alleviates such problems by strategically depositing a thin capping layer of chromium on a magnetic layer, e.g., the uppermost of a plurality of magnetic layers. The chromium capping layer in accordance with the present invention is the elemental form of chromium as commercially available in unalloyed form which may include small concentrations of impurities which do not affect its characteristics.

It was found that the deposition of a thin chromium capping layer, particularly when applying a negative bias to the substrate, results in diffusion of chromium in the grain boundaries of the underlying magnetic layer, thereby improving grain isolation and reducing inter-granular exchange coupling with an attendant reduction in media noise, i.e., an increase in SNR. Even a discontinuous chromium layer, achieves an improvement in grain isolation by reducing inter-granular exchange coupling. Deposition of a thin chromium capping layer also protects the upper surface of the magnetic layer against poisoning from residual gases in the vacuum system and as well as process gases during deposition of the overcoat system. In addition, the thin chromium capping layer provides protection against corrosion by compensating for thin and imperfect protective overcoats. In fact, embodiments of the present invention enable elimination of a protective overcoat, e.g., conventional carbon-containing protective overcoat and application of the lubricant topcoat directly on the chromium capping layer.

Embodiments of the present invention can comprise applying a negative bias, as at about −200 to about −300 volts, e.g., about −250 volts, to the substrate and depositing a flash chromium capping layer consisting essential of elemental chromium, as at a thickness up to about 10 Å, such as about 3 Å to about 8 Å, e.g., about 5 Å to about 8 Å. A discontinuous layer of a chromium also yields an advantageous improvement in grain isolation by reducing inter-granular exchange coupling, thereby reducing medium noise.

The thin chromium capping layer formed in accordance with embodiments of the present invention ensures protection against corrosion, particularly for magnetic cobalt alloy layers, as due to imperfections, such as discontinuities or voids, formed as the thickness of the protective overcoat system is decreased. In embodiments of the present invention, exposed areas of the chromium capping layer will form protective chromium oxide, thereby preventing corrosion of the underlying magnetic layer. Thus, embodiments of the present invention include a chromium capping layer having portions thereof which have been converted to chromium oxide at the location of a discontinuity in the overlying protective overcoat, e.g., a conventional carbon-containing protective overcoat.

Embodiments of the present invention further comprise elimination of the protective overcoat and deposition of a lubricant topcoat directly on the thin chromium capping layer. In such embodiments, the chromium capping layer can be entirely oxidized to form a chromium oxide coating protecting the underlying magnetic layer form corrosion.

Embodiments of the present invention, therefore, comprise depositing a chromium capping layer on an uppermost layer of a magnetic recording medium at a thickness up to about 10 Å. Upon exposure, chromium oxide will form, at a thickness of about 1 to about 3 monolayers. An optional carbon-containing protective overcoat can be applied, as at the thickness of about 3 Å to about 40 Å, followed by a lubricant topcoat, typically at a thickness up to about 10 Å. The resulting magnetic recording medium exhibits reduced medium noise by virtue of diffusion of chromium along the grain boundaries of the underlying magnetic layer, resulting in a concentration of chromium within the grain boundaries decreasing from the upper surface the underlying magnetic layer toward the lower surface of the magnetic layer. The chromium and/or chromium oxide capping layer provides protection to the upper surface of the magnetic layer against poisoning from residual gases and process gases, as well as protection against corrosion.

Embodiments of the present invention comprise magnetic recording media having conventional overcoats, conventional seedlayers and/or underlayers, and conventional magnetic alloy layers, particularly magnetic alloy layers containing cobalt and chromium, e.g., magnetic CoCrPtB alloys. Typically, the magnetic alloy layer contains in excess of 10 at. % chromium.

Figure 1:
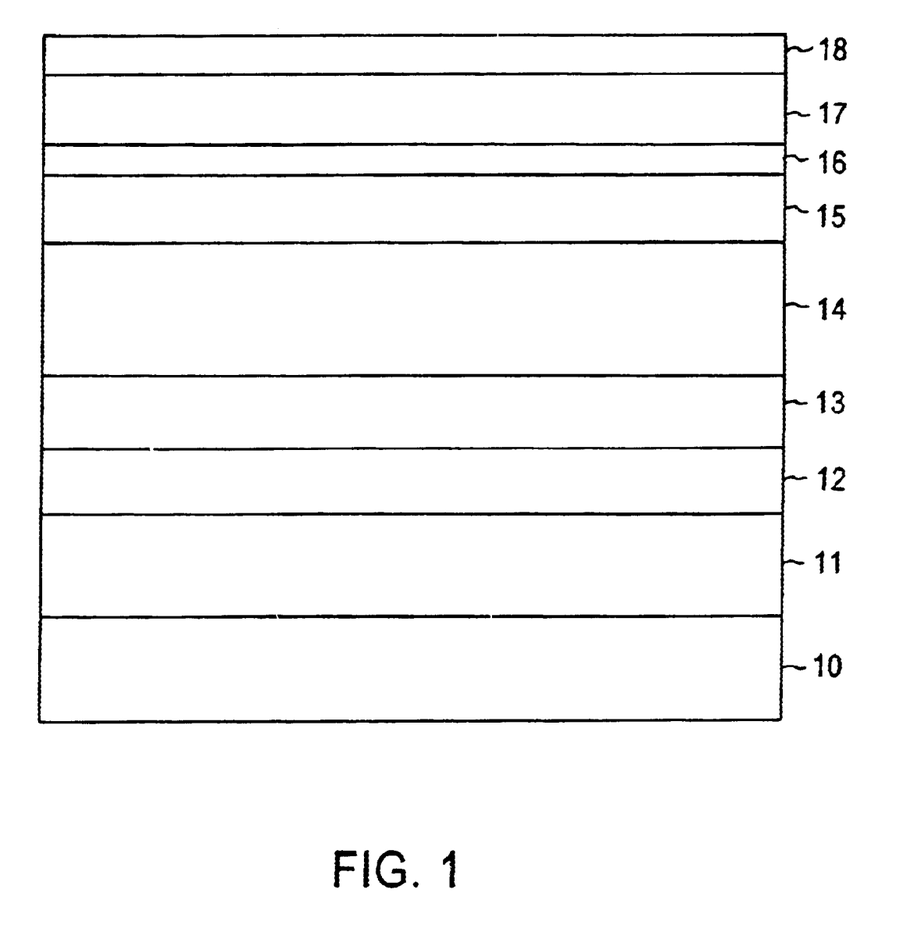
FIG. 1 schematically illustrates a magnetic recording medium in accordance with an embodiment of the present invention.

An embodiment of the present invention is schematically illustrated in FIG. 1 and comprises a conventional substrate 10, and conventional seedlayer(s) and/or underlayer(s) formed over the substrate 10. In the particular depicted embodiment shown in FIG. 1, sequentially deposited on substrate 10 are an underlayer structure comprising a layer of chromium 11 and a layer of a chromium-tungsten alloy 12, followed by an intermediate layer 13 comprising an alloy of cobalt and chromium. Magnetic layer 14, formed at a suitable thickness, e.g., about 50 Å to about 500 Å, can comprise a CoCrPtB alloy, while magnetic layer 15, formed at suitable a thickness, e.g., about 3 Å to about 15 Å, can comprise a different alloy. The flash capping layer of chromium 16 is then deposited, followed by an optional protective coating 17, such as a conventional carbon-containing protective coating. A lubricant topcoat 18 is then applied.

EXAMPLES

A series of disks having a basic structure corresponding to that depicted in FIG. 1 representing the present invention were prepared. A control disk C6 was prepared with a carbon overcoat having a thickness of about 60 Å but without the chromium capping layer 16. The series of disks representing the present invention were prepared with a chromium capping layer 16 at a thickness of 5 Å, 10 Å, 15 Å and 20 Å, identified as disks C7, C8, C9, C10, respectively. The disks were subjected to testing and the data are reported in Table I below.

TABLE I

| Disk ID | Cr Cap Thk (Å) | Overcoat Carbon Thk (Å) | Hc (Oe) | MrT (memu/cm$^2$) | S* | MFA (mV) | LFA (mV) | Res (%) | PW50 (nsec) | PW50 (uln) | OW (-dB) | WBN (mV) | SNR (dB) | OTC (uin) | Err-Rate err10E- |
|---|---|---|---|---|---|---|---|---|---|---|---|---|---|---|---|
| C6 | 0 | 60 | 3595 | 0.400 | 0.876 | 1.410 | 2.413 | 58.46 | 11.77 | 5.64 | 31.26 | 47.40 | 15.06 | 1.93 | 5.03 |
| C7 | 5 | 55 | 3806 | 0.390 | 0.843 | 1.361 | 2.338 | 58.23 | 11.81 | 5.66 | 31.11 | 40.05 | 16.29 | 3.15 | 5.84 |
| C8 | 10 | 50 | 3781 | 0.378 | 0.841 | 1.322 | 2.274 | 58.15 | 11.76 | 5.63 | 31.74 | 38.17 | 16.45 | 2.75 | 5.78 |
| C9 | 15 | 45 | 3812 | 0.376 | 0.831 | 1.318 | 2.264 | 58.22 | 11.81 | 5.66 | 31.86 | 38.10 | 16.44 | 3.54 | 5.81 |
| C10 | 20 | 40 | 3740 | 0.366 | 0.845 | 1.308 | 2.242 | 58.33 | 11.72 | 5.61 | 32.10 | 37.12 | 16.59 | 3.49 | 5.94 |

In Table 1, "$H_c$" represents correscivity, "MrT" represents the product of magnetic remanence (Mr) and thickness of the film (T), "S*" represents squareness, "MFA" represents medium frequency amplitude, "LFA" represents low frequency amplitude, "Res" represents resolution, "PW50" represents the isolated readback measured at 50% of the base to the amplitude, "OW" represents overwrite, "WBN" represents wide band noise, "SNR" represents signal to noise ratio, and "OTC" represents off track capability.

In the disks tested and reported in Table 1, a total thickness for the combined chromium capping layer and carbon overcoat was 60 Å, corresponding to the thickness of the carbon overcoat of control disk C6. As reported in Table I, S* drops from 0.876 (C6) to 0.843 (C7), while Hc increases 211 Oe and SNR increases 1.23 dB with respect with to the control disk (C6). An increase in the thickness of the chromium capping layer from 5 Å to 20 Å leads to an MrT decrease while S* remains the same. Thus, a chromium capping layer thickness of 5 Å provided in a optimum compromise of magnetic properties.

Figure 2:
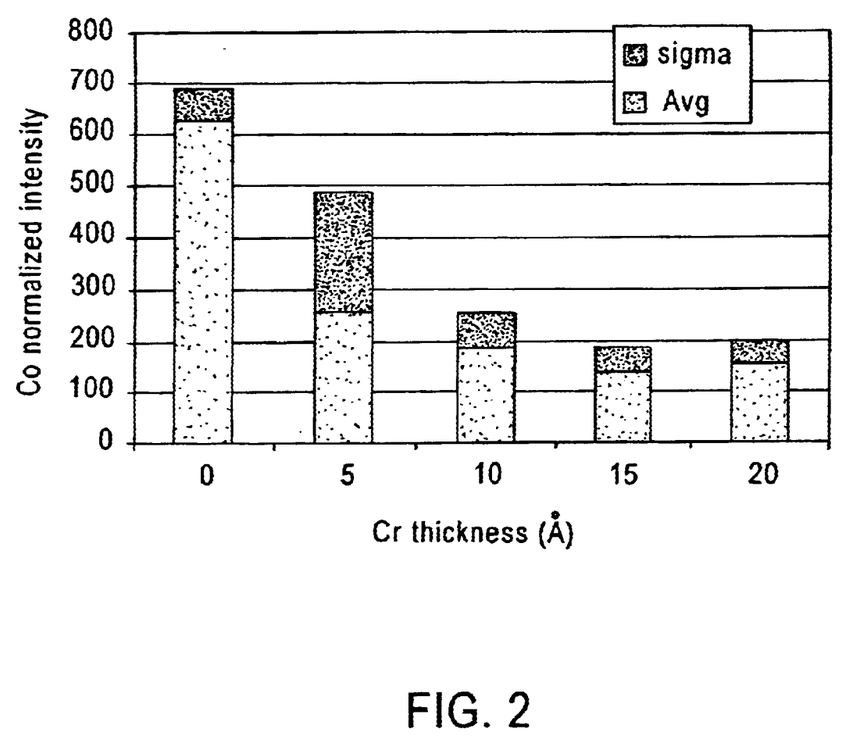
FIG. 2 is a graphical illustration of corrosion performance of disks fabricated with a chromium capping layer.

Corrosion testing was conducted on disks C6–C10 and the results reported in FIG. 2. The disks with the chromium capping layer configuration (C7–10) were stressed in an environment chamber at 80° C. and 80% relative humidity for 96 hours. The corrosion products (Co) on the surfaces were measured by time-of-flight secondary ion mass spectroscopy (TOF-SIMS), employing a test procedure reported in IEEE Trans Mag 33, 3154 (1997). The data reported in FIG. 2 indicate that the corrosion performance of the disks having the chromium capping layer was significantly improved. The normalized Co intensity was reduced by as much as 70% for a 10 Å chromium capping layer. The data also indicate that the 5 Å layer configuration has a greater standard deviation as compared to the samples tested, suggesting that the 5 Å chromium capping layer was not continuous and, hence, only provided a partial barrier to corrosion.

Figure 3:
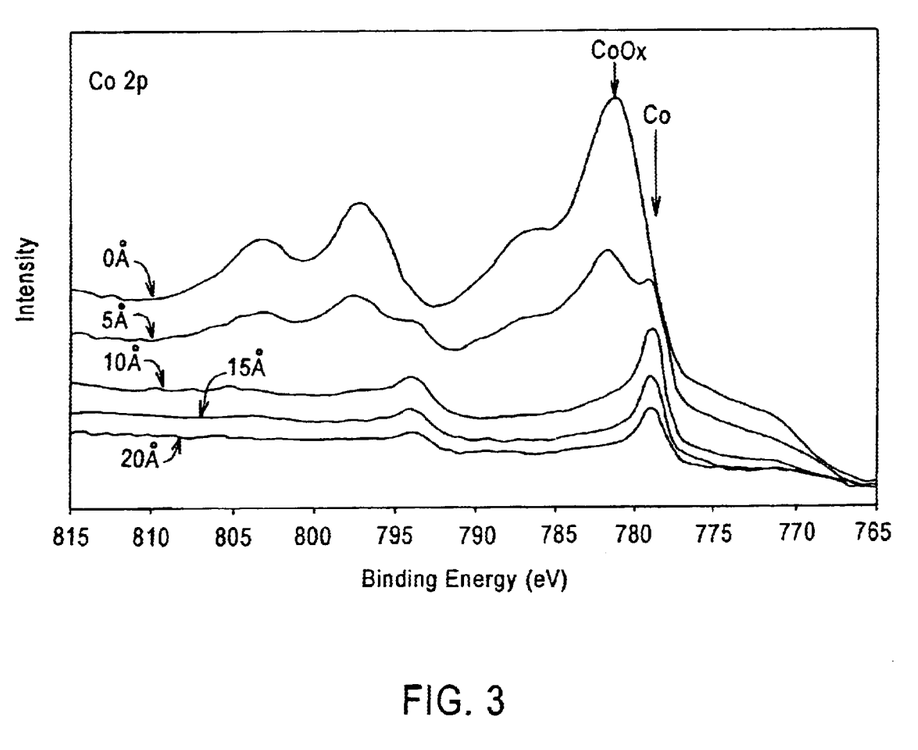
FIG. 3 contains X-ray photoemission spectroscopy data of disks evaluated for corrosion performance shown in FIG. 2.

Additional data obtained by X-ray photoemission spectroscopy shown in FIG. 3 indicated that the 5 Å chromium capping layer does not completely prevent surface oxidation of the magnetic layer. As shown in FIG. 3, the cobalt oxidation (CoOx) disappears with a 10 Å capping layer.

Figure 4A:
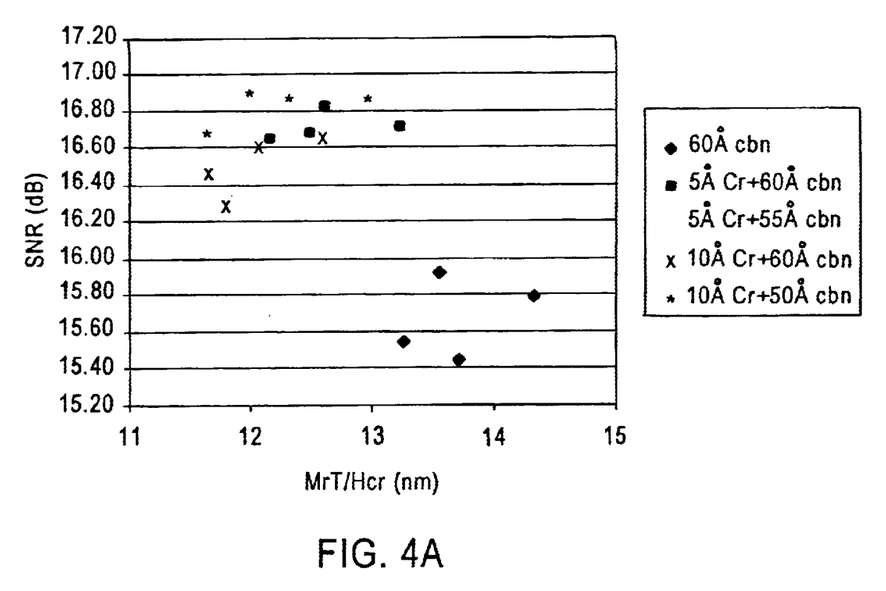
FIGS. 4A and 4B contain heat curves for magnetic recording media in terms of SNR vs. MrT/Hcr and OW vs. MrT/Hcr, respectively.
Figure 4B:
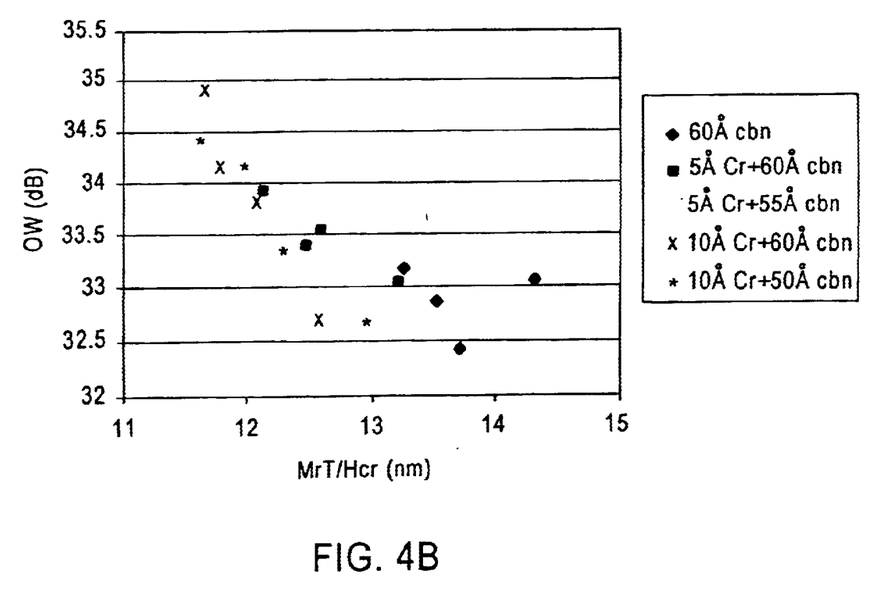

Further testing was conducted to show the effect of the chromium capping layer on magnetic performance by generating a series of heat family curves, as which are shown in FIGS. 4A and 4B. It is clear from FIG. 4A that the use of a chromium capping layer improves the SNR. For example, the SNR of a disk with a 5 Å chromium capping layer and 55 Å carbon layer is greater than that of a disk with a 5 Å chromium capping layer and a 60 Å layer. FIG. 4B indicates that the OW is about the same with or without a chromium capping layer. The data reported in FIGS. 4A and 4B were obtained from media substantially corresponding to that depicted in FIG. 1.

Figure 5:
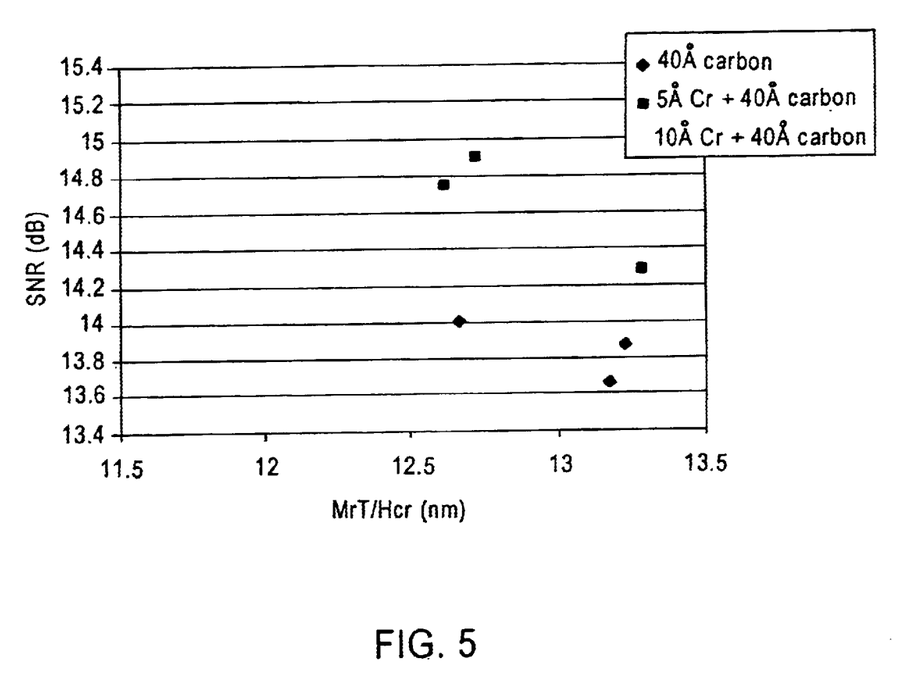
FIG. 5 illustrates the effect of the thickness of the chromium capping layer on SNR.

Further testing was conducted on different disks with variations in the chromium capping layer 16 and carbon-containing protective overcoat 17. In these disks, the carbon thickness was maintained at 40 Å while the chromium capping layer varied from 0 Å (no chromium capping layer), 5 Å and 10 Å. The results are reported in FIG. 5 and show that there is 0.5 to 1.0 bB improvement in SNR, with no significant difference between a 5 Å and 10 Å capping layer.

Considering corrosion performance, a chromium capping layer having a thickness of about 10 Å would provide suitable results. However, as the thickness of the chromium capping layer approaching 10 Å, e.g., greater than about 8 Å, tribological performance is degraded. Accordingly, embodiments of the present invention comprise providing a chromium capping layer at a thickness of up to about 10 Å, such as about 3 Å to about 8 Å, e.g., about 5 Å to about 8 Å. The chromium capping layer can be applied at a thickness greater than 10 Å. However, at a thickness greater than 10 Å, no additional improvement in corrosion or magnetic properties is observed.

In FIG. 1, layers are depicted as formed sequentially on one side of substrate 10. However, consistent with conventional practices, the depicted layers are actually formed on both sides of the substrate but have been omitted from FIG. 1 for illustrative convenience. It should also be recognized that magnetic alloy layers suitable for use in the present invention include various magnetic alloys, e.g., various Co—Cr alloy systems. The present invention is not limited to any particular substrate material, seedlayer material, underlayer material, or number of seedlayers and underlayers, or to any particular optional protective overcoat or lubricant topcoat. Magnetic recording media in accordance with the present invention can be manufactured in conventional sputtering apparatus, including DC single disk sputtering apparatuses as well as in-line passby systems.

Embodiments of the present invention enable the manufacturer of high areal density magnetic recording media exhibiting an increased SNR from reduced inter-granular exchange coupling, reduced vulnerability to surface poisoning by residual and/or process gases and improved corrosion resistance. In addition, the magnetic recording media in accordance with the present invention exhibit improved magnetic performance.

The present invention enjoys industrial utility in manufacturing any of various types of magnetic recording media, including thin film disks. The present invention is particularly applicable in producing high recording areal density magnetic recording media requiring a low flying height and exhibiting resistance to environmental attacks, such as corrosion.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:

a non-magnetic substrate;

an underlayer over the substrate;

a first magnetic layer over the underlayer; and;

a capping layer, consisting essentially of chromium and/or chromium oxide, and having a thickness up to about 10 Å, on the first magnetic layer.

2. The magnetic recording medium according to claim 1, wherein the capping layer has a thickness of about 3 Å to about 8 Å.

3. The magnetic recording medium according to claim 1, wherein the capping layer consists essentially of chromium.

4. The magnetic recording medium according to claim 3, comprising a protective overcoat on the capping layer.

5. A magnetic recording medium comprising:

a non-magnetic substrate;

an underlayer over the substrate;

a first magnetic layer over the underlayer; and;

a capping layer, consisting essentially of chromium oxide, and having a thickness up to about 10 Å, on the first magnetic layer.

6. The magnetic recording medium according to claim 5, comprising a lubricant topcoat formed on the chromium oxide capping layer without a protective overcoat therebetween.

7. The magnetic recording medium according to claim 1, further comprising:

an optional protective overcoat on the capping layer; and an overlying lubricant topcoat.

8. The magnetic recording medium according to claim 1, wherein:

the first magnetic layer comprises a magnetic alloy having an upper surface, a lower surface and grains separated by grain boundaries; and chromium is diffused into the grain boundaries in an amount gradually decreasing from the upper surface toward the lower surface.

9. The magnetic recording medium according to claim 1, comprising a second magnetic layer between the underlayer and the first magnetic layer.

10. The magnetic recording medium according to claim 9, wherein each of the first and second magnetic layers comprises cobalt and chromium.

11. A method of manufacturing a magnetic recording medium, the method comprising:

forming an underlayer over a non-magnetic substrate;

forming a first magnetic layer over the underlayer; and depositing a capping layer, consistent essentially of chromium at a thickness up to about 10 Å, on the first magnetic layer.

12. The method according to claim 11, comprising:

depositing the capping layer at a thickness of about 3 Å to about 8 Å.

13. The method according to claim 11, comprising:

depositing an optional protective overcoat on the capping layer; and depositing an overlying lubricant topcoat.

14. The method according to claim 11, comprising forming a second magnetic layer between the underlayer and the first magnetic layer.

15. The method according to claim 14, wherein each of the first and second magnetic layer comprises cobalt and chromium.

* * * * *

UNITED STATES PATENT AND TRADEMARK OFFICE
CERTIFICATE OF CORRECTION

PATENT NO. : 6,641,932 B1
DATED : November 4, 2003
INVENTOR(S) : Weilu Xu et al.

It is certified that error appears in the above-identified patent and that said Letters Patent is hereby corrected as shown below:

<u>Title page,</u>
Item [75], Inventors, after "Roger Shih, Cupertino, CA (US)" add -- Zhiwei Cai, Fremont, CA (US); Jeffrey Shane Reiter, Palo Alto, CA (US); Stephen Eric Barlow, Fremont, CA (US) --

Signed and Sealed this

Eighteenth Day of May, 2004

JON W. DUDAS
*Acting Director of the United States Patent and Trademark Office*